Figure 1:
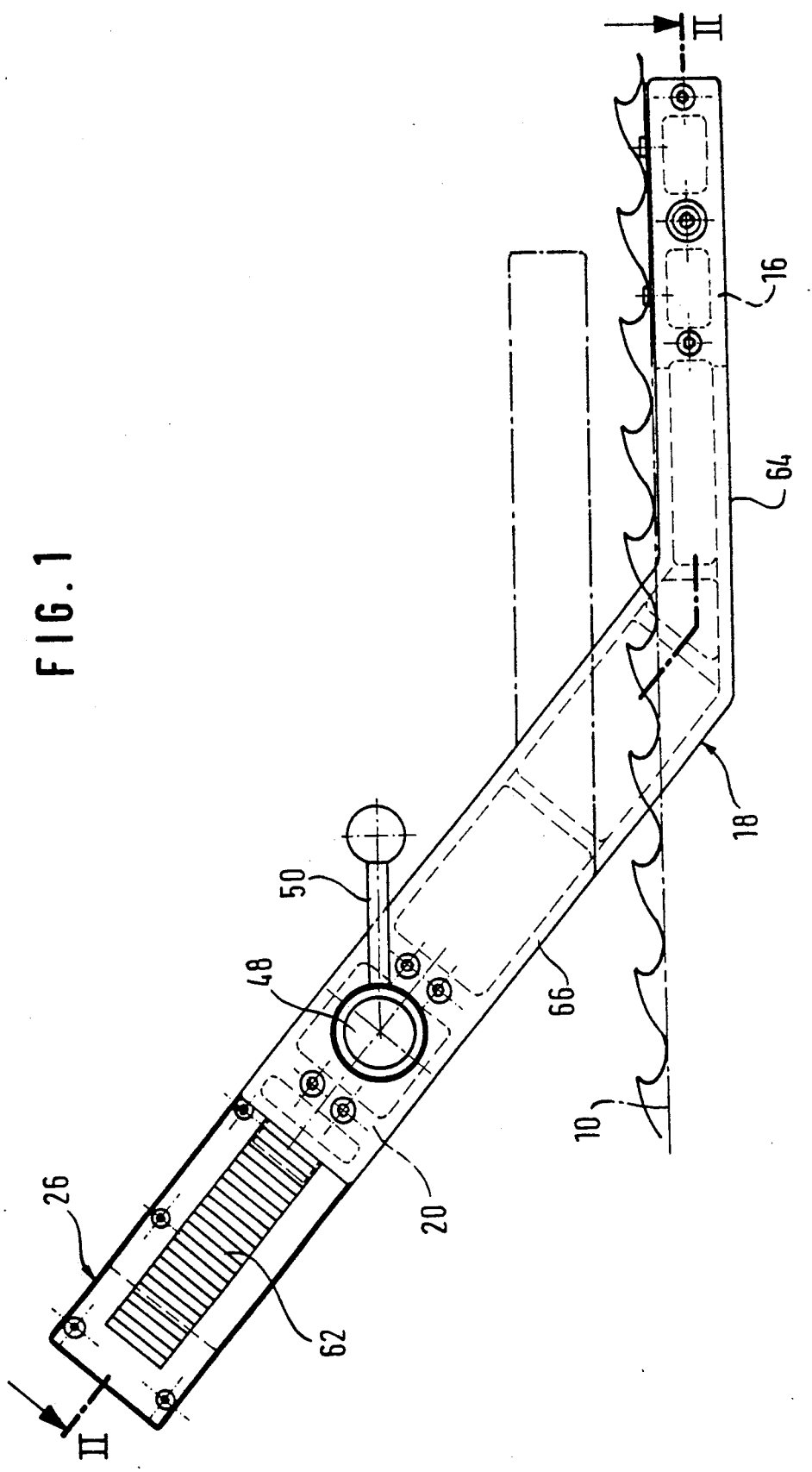

United States Patent [19]

Lenard et al.

[11] Patent Number: 5,297,455
[45] Date of Patent: Mar. 29, 1994

[54] SAW BLADE CLAMPING DEVICE FOR SAW FINISHING MACHINES

[75] Inventors: Peter Lenard; Fritz Riehlein, both of Biberach/Riss; Hans-Joachim Reimann, Dellmensingen, all of Fed. Rep. of Germany

[73] Assignee: Vollmer Werke Maschinenfabrik GmbH, Biberach/Riss, Fed. Rep. of Germany

[21] Appl. No.: 958,364
[22] PCT Filed: May 8, 1992
[86] PCT No.: PCT/EP92/01009
§ 371 Date: Dec. 30, 1992
§ 102(e) Date: Dec. 30, 1992
[87] PCT Pub. No.: WO92/20486
PCT Pub. Date: Nov. 26, 1992

[30] Foreign Application Priority Data
May 10, 1991 [DE] Fed. Rep. of Germany ....... 4115319

[51] Int. Cl.$^5$ ............................................. B23D 63/00
[52] U.S. Cl. ..................................................... 76/79.5
[58] Field of Search ................................. 76/78.1, 79.5

[56] References Cited

FOREIGN PATENT DOCUMENTS 874551 4/1953 Fed. Rep. of Germany .

Primary Examiner—Roscoe V. Parker
Attorney, Agent, or Firm—Woodard, Emhardt, Naughton, Moriarty & McNett

[57] ABSTRACT

A movable clamping jaw (14) cooperating with a stationary clamping jaw (12) is carried by a support member (20) which is guided for displacement at a bracket (26) by a flat guide means (30) to cause slightly arcuate movement, deviating only a little from the plane of the saw blade, of the movable clamping jaw (14) away from the stationary clamping jaw (12). The support member is adapted to be clamped to the bracket (26) and, in addition, is connected to the bracket (26) by a four-joint arrangement (22). The clamping device needs only little room for opening and closing.

9 Claims, 2 Drawing Sheets

SAW BLADE CLAMPING DEVICE FOR SAW FINISHING MACHINES

The invention relates to a saw blade clamping device for saw finishing machines, comprising a stationary clamping jaw and a movable clamping jaw which is hingedly connected to a bracket and adapted to be fastened in clamping position in which it presses a saw blade against the stationary clamping jaw.

The designation of a clamping jaw as being stationary in the present context is meant to express that the clamping jaw adopts a certain position at a saw finishing machine during the entire finishing work on a saw blade and usually also for a plurality of successive identical saw blades. This does not exclude, however, that the stationary clamping jaw is adjustable for resetting of the saw finishing machine, for example for purposes of adaptation to saw blades of different thickness or different depth of tooth.

It has been common for a long time to clamp saw blades between a stationary clamping jaw, in the sense explained above, and a movable clamping jaw as close as possible to a finishing station where, for instance, tooth surfaces are ground so that accurate machining largely without vibrations becomes possible. The clamping force normally is selected so that the friction it generates will prevent any unintentional displacement of the saw blade, while the required advancing movements remain possible without opening of the clamping device.

With known saw blade clamping devices (DE-PS 874 551) the movable clamping jaw is disposed at a carrier lever which is supported by a bracket on a horizontal axis, can be locked in a vertical clamping position, and is pivotable forwardly in downward direction from this clamping position towards the user. Therefore, the carrier lever needs a lot of space in the area in which the user should be able to move without obstruction, if at all possible, in order to place a respective new saw blade in the clamping device, set the corresponding finishing machine, and take out the finished saw blade. Particularly the handling of bigger circular saws or band saws for which a hoisting means is needed can be rendered quite a bit more difficult by a downwardly turned carrier lever because the user must concentrate on controlling the hoisting means and the motions of the saw blade caused by it, rather than paying the foremost attention to not hitting the carrier lever.

It is, therefore, the object of the invention to improve a saw blade clamping device such that it will cause the least possible obstruction to the user when he introduces or withdraws a saw blade into or from a saw finishing machine and when he sets the machine.

The object is met, in accordance with the invention, starting from a saw blade clamping device of the kind specified initially, in that the movable jaw is supported on a support member which is guided for displacement at the bracket by a flat guide means to cause slightly arcuate movement, deviating only a little from the plane of the saw blade, of the movable clamping jaw away from the stationary clamping jaw, which support member further is adapted to be clamped to the bracket and is connected to the same in addition by a four-joint arrangement.

When the clamping jaw is opened, as a result of this arrangement, the movable clamping jaw initially does move away from the plane of the saw blade, at the start of its slightly arcuate movement, so as not to get stuck at any set or thickened tooth tips, such as teeth that have been upset or provided with hard metal tips. Then, however, on its way away from the saw blade, it moves away only very little from the plane of the saw blade. In similar manner, the movable clamping jaw approaches its own closing position in a flat path upon closing of the clamping device so that it will always just barely be spaced from the plane of the saw blade so as not to hit against a tooth in case the saw blade should be warped. Consequently the saw blade clamping device according to the invention requires only little space in the user's working area to carry out its opening and closing movements.

The flat guide means may comprise two parallel, planar guide surfaces facing each other and extending at right angles to the plane of the saw blade, the support member being displaceable between them. An inverted arrangement is feasible as well in the sense that the support member rides on a guide means which includes two guide surfaces facing away from each other.

Preferably, the flat guide means is inclined with respect to the horizontal. In this manner the clamping jaw can be moved a short distance, for instance obliquely upwardly, out of the operating range of the associated saw finishing machine and yet still offer easier access to the user than a vertical provision of the flat guide means would do.

Figure 2:
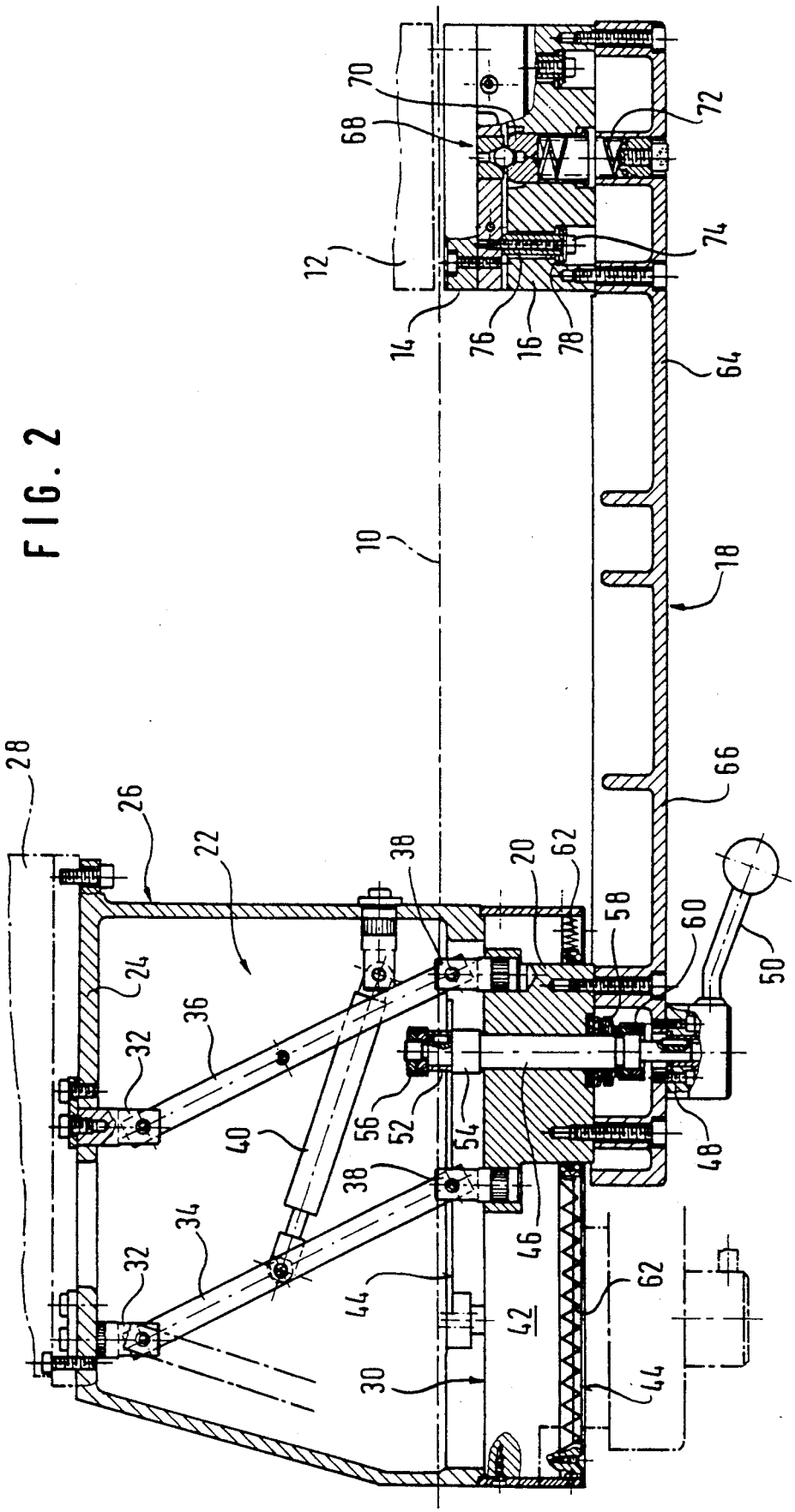

An embodiment of the invention will be explained in greater detail below with reference to diagrammatic drawings, in which:

FIG. 1 is a front elevational view of a saw blade clamping device according to the invention and FIG. 2 is the angled section II—II of FIG. 1.

A stationary clamping jaw 12 and a movable clamping jaw 14 are provided to clamp a saw blade 10 —the example shown being a band saw blade. The movable clamping jaw 14 is hingedly connected to a head piece 16 secured to a support member 20 by way of a cranked arm 18. The support member 20 is supported by means of a four-joint arrangement 22 in a rear wall 24 of a housing-type bracket 26. The bracket 26 is devised for being fastened to a machine frame 28, indicated by dash-dot lines, of a saw finishing machine which also supports the stationary clamping jaw 12.

The four-joint arrangement 22 is relieved of all the clamping forces and the inherent weight of the movable clamping jaw 14, as well as that of the structural elements mentioned which carry it, including the support member 20, by virtue of the latter being guided in a flat guide means 30 formed at the front side of the bracket 26. The four-joint arrangement 22 comprises two fork-type joints 32 which are fastened to the rear wall 24 and each connected by a link 34 and 36, respectively, to one each of two fork-type joints 38 fastened to the support member 20. In the embodiment shown, the links 34 and 36 both have the same length, the fork-type joints 32 are disposed at the same distances from each other as the fork-type joints 38 and, moreover, the connecting line between the two joints at the fork-type joints 32 extends parallel to the connecting line between the two joints at the fork-type joints 38.

Consequently the four-joint arrangement 22 illustrated presents a parallelogram guide rod assembly which makes sure that the arm 18 will remain in parallel with the plane of the saw blade 10 during all its movements. However, minor changes made in one of the joint spacings mentioned or in the length of one or the other link 34 or 36 can have the effect that, upon opening of the clamping device, the four-joint arrangement 22 first will cause slight pivoting motion of the movable clamping jaw 14 away from the saw blade plane and subsequently further movement essentially parallel to the plane of the saw blade.

The flat guide means 30 extends obliquely upwards away from the saw blade 10, at an angle of approximately 40° with respect to the horizontal in the embodiment shown. Thus the links 34 and 36 are pivotable in an oblique plane, preferably a common one. A weight balancing means 40 is provided to facilitate the upward movement of the support member 20 with the structural elements connected to it. In the embodiment shown, this is a gas spring which has one end pivotably connected to the link 34 and the other end to the bracket 26.

The support member 20 is guided substantially without clearance between two parallel guide surfaces 42 of the flat guide means 30. The guide surfaces 42 may be sliding surfaces in direct contact with corresponding sliding surfaces of the support member 20. Alternatively, balls can be embedded in the guide surfaces 42 or in the support member 20 so as to keep the movements of the support member free of sliding friction. In the embodiment shown, the flat guide means 30 further comprises a pair of clamping surfaces 44 which extend spaced from each other, at right angles to the guide surfaces 42, and in a vertical plane each and which are interrupted by the spacing between the guide surfaces 42.

A horizontal shaft 46 extending at right angles to the clamping surfaces 44 passes through this spacing and through the support member 20 as well as the end of the arm 18 secured to the same, the shaft being supported for axial displacement in the support member 20. A hub 48 carrying a clamping lever 50 is fastened to the outer end of the shaft 46, while a cam 52 is attached to the inner end, which cam has an end face of the type of an axial cam plate facing the inner clamping surface 44. The cam 52 bears against a collar 54 on the shaft and is retained by a pair of nuts 56.

A compression spring 58 embodied by a stack of Belleville springs is provided in a cavity formed in the arm 18, being tightened between the support member 20 and a pair of nuts 60 threaded on the shaft 46 so that the shaft 46 is biased outwardly in its axial direction, thereby attempting to keep the cam in abutment with the inner clamping surface 44. The shaft 46 can be turned by means of the clamping lever 50 between a release position and a clamping position. In the release position, the support member 20 is free to slide in the flat guide means 30; in the clamping position it —and therefore the arm 18, too, —is clamped rigidly to the bracket 26.

Flexible boots 62 protect the flat guide means 30 and the interior of the bracket 26 from contamination.

Since the clamping device of the embodiment shown is destined for a horizontally disposed band saw, the arm 18 includes a horizontal limb 64 and a limb 66 which is inclined in correspondence with the inclination of the flat guide means 30. A ball joint 68 supports the movable clamping jaw 14 at the free end of the horizontal limb 64. The ball joint comprises a socket 70 which is guided for displacement in the head piece 16 at right angles to the plane of the saw blade, in other words horizontally, and which is biased by a central spring 72 in the direction of the saw blade 10. This bias is counteracted by screw bolts 74 which are threaded through a spacer sleeve 76 each into the movable clamping jaw 14 and each rest on the head piece 16 through intermission of a spring 78, e.g. a stack of Belleville springs. The spacer sleeves 76 are received with radial clearance in the head piece 16. In this manner it is assured that the movable clamping jaw 14 cannot tilt so as to adapt to the saw blade 10 also in case the arm 18 should happen to be inclined slightly with respect to the plane of the saw blade.

What is claimed is:

1. A saw blade clamping device for saw finishing machines, comprising a stationary clamping jaw (12) and a movable clamping jaw (14) which is hingedly connected to a bracket (26) and adapted to be fastened in clamping position in which it presses a saw blade (10) against the stationary clamping jaw (12), characterized in that the movable jaw (14) is carried by a support member (20) which is guided for displacement on the bracket (26) by a flat guide means (30) to cause a slightly arcuate movement, deviating only a little from the plane of the saw blade, of the movable clamping jaw (14) away from the stationary clamping jaw (12), which support member further is adapted to be clamped to the bracket (26) and is connected to the same in addition by a four-joint arrangement (22).

2. The saw blade clamping device as claimed in claim 1, characterized in that the flat guide means (30) has two parallel, planar guide surfaces (42) facing each other and extending at right angles to the plane of the saw blade, the support member (20) being displaceable between them.

3. The saw blade clamping device as claimed in claim 2, characterized in that the flat guide means (30) is inclined with respect to the horizontal.

4. The saw blade clamping device as claimed in claim 3, characterized in that the four-joint arrangement (22) comprises a weight balancing means (40).

5. The saw blade clamping device as claimed in claim 3, characterized in that the movable clamping jaw (14) is connected to the support member (20) by a cranked arm (18) which includes a horizontal limb (64) and a limb (66) inclined in accordance with the inclination of the flat guide means (30).

6. The saw blade clamping device as claimed in claim 1, characterized in that the four-joint arrangement (22) comprises two parallel links (34, 36).

7. The saw blade clamping device as claimed in claim 1, characterized in that the support member (20) supports a shaft (46) which carries a clamping lever (50) at one end and a cam (52) at the other end, the cam being adapted to be clamped at the flat guide means (30) by turning of the clamping lever (50).

8. The saw blade clamping device as claimed in claim 7, characterized in that the flat guide means (30) has two clamping surfaces (44) for the cam (52) extending parallel to the plane of the saw blade.

9. The saw blade clamping device as claimed in claim 4, characterized in that the movable clamping jaw (14) is connected to the support member (20) by a cranked arm (18) which includes a horizontal limb (64) and a limb (66) inclined in accordance with the inclination of the flat guide means (30).

* * * * *